United States Patent
Coda Zabetta et al.

(10) Patent No.: US 7,569,200 B2
(45) Date of Patent: Aug. 4, 2009

(54) METHOD FOR REDUCING NITROGEN OXIDE EMISSIONS

(75) Inventors: Edgardo Coda Zabetta, Turku (FI); Mikko Hupa, Turku (FI); Kari Saviharju, Espoo (FI)

(73) Assignee: Andritz Oy, Helsinki (FI)

( * ) Notice: Subject to any disclaimer, the term of this patent is extended or adjusted under 35 U.S.C. 154(b) by 211 days.

(21) Appl. No.: 11/628,009

(22) PCT Filed: Jun. 2, 2005

(86) PCT No.: PCT/FI2005/000254

§ 371 (c)(1),
(2), (4) Date: Feb. 8, 2007

(87) PCT Pub. No.: WO2005/118113

PCT Pub. Date: Dec. 15, 2005

(65) Prior Publication Data
US 2007/0231231 A1    Oct. 4, 2007

(30) Foreign Application Priority Data
Jun. 3, 2004    (FI)    ................................. 20040763

(51) Int. Cl.
*B01D 53/54* (2006.01)
*B01D 53/56* (2006.01)
*F23C 7/00* (2006.01)
*F23G 7/04* (2006.01)
*F23G 7/06* (2006.01)
*F23J 15/00* (2006.01)

(52) U.S. Cl. ........................... 423/235; 423/236; 431/2; 431/5; 431/174; 110/210; 110/214

(58) Field of Classification Search ................. 423/235, 423/236; 431/2, 5, 174; 110/210, 214
See application file for complete search history.

(56) References Cited

U.S. PATENT DOCUMENTS

| 4,985,219 | A  | * | 1/1991 | Helfritch et al. | ............ 423/235 |
| 5,139,755 | A  | * | 8/1992 | Seeker et al. | ................ 423/235 |
| 6,213,032 | B1 | * | 4/2001 | Breen et al. | ................. 110/345 |
| 2006/0008757 | A1 | * | 1/2006 | Zamansky et al. | ............ 432/18 |
| 2007/0034126 | A1 | * | 2/2007 | Chen et al. | .................. 110/345 |

OTHER PUBLICATIONS

Xu et al; "Computational Model for $NO_x$ Reduction by Advanced Reburning"; Energy & Fuels 1999, 13, pp. 411-420.
Winter et al; "NO and $N_2O$ Formation During the Combustion of Wood, Straw, Malt Waste and Peat"; Bioresearch Technology 70 (1999), pp. 39-49.

(Continued)

*Primary Examiner*—Timothy C Vanoy
(74) *Attorney, Agent, or Firm*—Nixon & Vanderhye P.C.

(57) ABSTRACT

The present invention relates to a method for reducing nitrogen oxide emissions in combustion. Fuel is combusted in a first zone, whereby nitrogen oxides are generated. Supplementary fuel is fed in another zone under reducing conditions. At the same time, the temperature is adjusted so that nitrogen oxides convert essentially to hydrogen cyanide. Finally, air is fed in for finalizing the combustion and converting the hydrogen cyanide into nitrogen.

15 Claims, 4 Drawing Sheets

OTHER PUBLICATIONS

Glarborg et al; "Some Aspects of Fuel Nitrogen Conversion in Solid Fuel Fired Systems"; Clean Air, Oporta (P), Sep.-Dec. 7, 2001; pp. 1-18.

Zamansky et al; "Reburning Promoted by Nitrogen- and Sodium-Containing Compounds"; Twenty-Sixth Symposium (International) on Combustion/The Combustion Institute, 1996, pp. 2075-2082.

Alzueta et al; "Modeling Low-Temperature Gas Returning. $NO_x$ Reduction Potential and Effects of Mixing"; Energy & Fuels 1998, 12, pp. 329-338.

Arakawa et al; "Application of an In-Furnance $NO_x$ Removal System for Recovery Boilers"; International Chemical Recovery, Conference, Oral Presentations, Jun. 11-16, 2001; Whistler, British Columbia, Canada, pp. 257-260.

Jensen et al; "Modelling of $NO_x$ Emissions from Pressured Fluidized Bed Combustion—A Parameter Study"; Chemical Engineering Science, vol. 52, No. 11, pp. 1715-1731, 1997.

Coda et al; "Coat-Nitrogen Release and $NO_x$ Evolution in Air-Staged Combustion"; Energy & Fuels 1998, 12, pp. 1322-1327.

Lyngfelt et al; "Combustion of Wood-Chips in Circulating Fluidized Bed Boilers—NO and CO Emissions as Functions of Temperature and Air-Staging"; Fuel 78 (1999), pp. 1065-1072.

Jodal et al; "$NO_x$ Removal on a Coat-Fired Utility Boiler by Selective Non-Catalytic Reduction"; Environmental Progress (vol. 11, No. 4), Nov. 1992, pp. 296-301.

Hasegawa et al; "Effect of Pressure on Emission Characteristics in LBG-Fueled 1500° C.-Class Gas Turbine"; Journal of Engineering for Gas Turbines and Power; vol. 20, Jul. 1998, pp. 481-487.

Chen et al; "Advanced $NO_x$ Reduction Processes Using -NH and -CN Compounds in Conjunction with Staged Air Addition"; Twenty-Sixth Symposium (International) on Combustion/The Combustion Institute, 1988, pp. 1135-1145.

Alzueta et al; "Laboratory Study of the $CO/NH_3/NO/O_2$ System: Implications for Hybrid Reburn/SNCR Strategies"; Energy & Fuels, 1997, 11, pp. 716-723.

Glarborg et al; "Nitric Oxide Reduction by Non-hydrocarbon Fuels. Implications for Reburning with Gasification Gases"; Energy & Fuels 2000, 14, pp. 828-838.

Fenimore, "Studies of Fuel-Nitrogen Species in Rich Flame Gases," Proc. Combust. Inst. 1978, 17, pp. 661-670, USA.

Malte et al, "Measurement of Atomic Oxygen and Nitrogen Oxides in Jet-Stirred Combustion," Proc. Combust Inst., 1974, 15, pp. 1061-1070, USA.

Coda Zabetta et al, "Improved $NO_x$ Submodel for In-Cylinder CFD Simulation of Low- and Medium-Speed Compression Ignition Engines," Energy & Fuels, American Chemical Society, 2001, 15, pp. 1425-1433, Finland.

Heap et al, "Emission of Nitric Oxide from Large Turbulent Diffusion Flames," Fourteenth Symposium (International) on Combustion, The Combustion Institute, 1973, 883-895, The Netherlands.

Wendt et al, "Reduction of Sulfur Trioxide and Nitrogen Oxides by Secondary Fuel Injection," Proc. Combust. Inst., 1973, 14, pp. 897-904, USA.

Folsom et al, "Field Experience with Advanced Gas Reburning For $NO_x$ Emissions Control," Proc. Am. Power Conf., 1998, 60, pp. 546-550, USA.

Zabetta et al, "Kinetic Modeling Study on the Potential of Staged Combustion in Gas Turbines for the Reduction of Nitrogen Oxide Emissions from Biomass IGCC Plants," Energy & Fuels, An American Chemical Society Journal, Reprinted from vol. 14, No. 4, 2000, pp. 751-761.

Zabetta et al, "Reducing NOx Emissions Using Fuel Staging, Air Staging, and Selective Noncatalytic Reduction in Synergy", Ind. Eng. Chem. Res. 2005, 44, 4552-4561.

\* cited by examiner

METHOD FOR REDUCING NITROGEN OXIDE EMISSIONS

This application is the U.S. national phase of international application PCT/FI2005/000254 filed 2 Jun. 2005 which designated the U.S. and claims benefit of FI 20040763, dated 3 Jun. 2004, the entire content of which is hereby incorporated by reference.

The present application relates to a novel technique for reducing the emission of NOx from a variety of combustion processes and devices.

BACKGROUND OF THE INVENTION

In the followings, details are given on NOx formation during combustion, on existing techniques for its reduction, and especially on its reduction in chemical recovery boilers at pulp mills.

Nitrogen Oxides from Combustion Processes (NOx=NO+$NO_2$)

Nitrogen oxides are known pollutants whose emission is regulated for most combustion devices. During combustion NOx generate from a portion of the nitrogen carried by air and fuel, while the remaining nitrogen is emitted in form of molecular nitrogen ($N_2$) and minor amounts of hazardous compounds such as nitrous oxide ($N_2O$), ammonia ($NH_3$), and hydrogen cyanide (HCN). The formation of NOx occurs via a number of routes, depending on conditions and fuels [1-7].

The purpose of all reducing techniques is to minimize the emission of polluting NOx, and thus to maximize the share of harmless $N_2$ while maintaining low the emission of all other hazardous compounds.

Time is a most important variable for all NOx reducing techniques, and thus for the process of the present invention. Time requirements can be governed either by physics (i.e. the time needed for reactants to mix) or by chemistry (i.e. the time needed for the chemical kinetics). In this patent application, the term "time" will be used when referring to the time required in real devices (i.e. both the physics and chemistry time). However, the process of the invention is mainly controlled by chemical kinetics. Thus, the term "chemistry time" will be introduced when focusing solely on the limitations set by chemical kinetics.

Fuel Staging (FS)

Fuel staging has been utilized in combustion devices for power generation to reduce $NO_x$ emissions. Fuel staging consists of staging the combustion fuel in a number of streams, which are delivered at convenient locations [8] in a combustion device. This technique has been applied in a variety of combustion devices since the 1970s. The simplest FS features a sequence of fuel streams located along the furnace in a vertical direction so as to set a progressive increase of the stoichiometric ratio (SR) from extremely lean (SR>>1, mixtures containing a much higher amount of air than that indicated by the stoichiometric ratio) to the nominal excess air that warrant complete combustion (SR≧1). The reactions inset at each fuel stream provide the radicals that reduce previously formed NOx. Typical radicals are methyl-($CH_i$), ketenyl-(HCCO), and hydrogen (H).

A more effective design for FS is the so-called "reburning" [9]. In reburning a primary fuel is burned to completion with excess air (primary combustion, $SR_I>1$), then reburn fuel is added to reset reducing conditions (reburn, $SR_{II}<1$), and finally combustion is completed with burnout air (burnout, $SR_{III}>1$). The primary zone assures efficient energy conversion, but also creates conditions that undesirably lead to NOx. The reburn zone is intended to reduce such NOx by producing the precursors and radicals that drive the reduction of NOx. The burnout zone assures the (almost) complete oxidation of the combustibles while minimizing the re-formation of NOx.

The effective reduction of NOx by fuel staging is limited to narrow temperature windows, which are determined by operational conditions such as pressure, stoichiometry, presence of various hydrocarbons, presence of carbon monoxide, and presence of nitrogen compounds else than NO and $N_2$. Two useful windows have been found by manipulating such variables: one is wide and located well above 1600 K (in practice above 1700 K) (high temperature reburning) [e.g., 10], while the other is narrow and located around 1500 K (low temperature reburning) [e.g., 11]. The first is used in furnaces for energy production, while the latter is used in waste incineration and in glass and steel industries. The two reburning techniques achieve NOx reductions of 50-70% and 45-55%, respectively. The above can be summarized as follows:

(1)

(2)

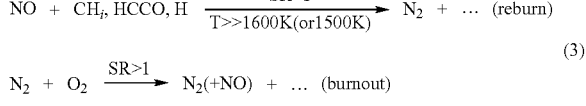
(3)

We note that in fuel staging other N-compounds can form. When it comes to HCN, all efforts are made either to minimize its formation by limiting the hydrocarbons in the fuel [12], or to allow time for its destruction by upsizing the furnace [11].

Air Staging (AS)

Air staging has been used since decades for reducing the formation of NOx by limiting the availability of promoters such as $O_2$, O, and OH. Air staging consists of staging the combustion air in a number of streams, which are delivered at convenient locations in a combustion device. This technique leads to ~50% NOx reduction. Similarly to FS, air staging is affected by parameters such as temperature, pressure, stoichiometry, availability of hydrocarbons, presence of N-compounds other than NO and $N_2$, but also by the number of stages [13]. Most favourable options include 3-5 air stages, whose stoichiometry is irrelevant as long as it increases while staying below 1 (SR<1) till the last stage [14]. This can be summarized as follows:

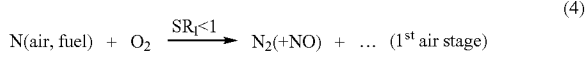
(4)

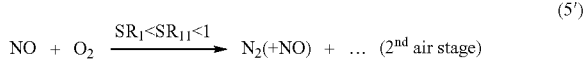
(5')

(5'')

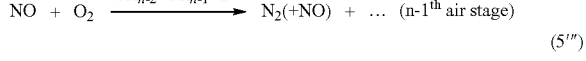
(5''')

Air staging was first applied in conventional furnaces, but with time has been adjusted and renamed for other applications, e.g. "late air-staging" for fluidized bed combustors [15] and "rich-lean combustion" for gas turbines [16]. In the same way as in FS, also in air staging, efforts a re taken to limit HCN, whose formation is undesirably enforced by the reducing conditions (SR<1) [16].

Selective Non-Catalytic Reduction (SNCR)

Selective non-catalytic reduction consists of driving the reduction of combustion-generated NOx via the addition of an agent [17]. This technique leads to approximately 50% NOx reduction, and its efficiency depends on the operational conditions, the fuel composition, and the agent. Accordingly, many variants of this technique have been patented, including a fuel-lean process with ammonia [18], a fuel-rich process with ammonia [19], and a fuel-rich process with urea [20]. The fuel-rich SNCR process with ammonia ($NH_3$) can be summarized as follows:

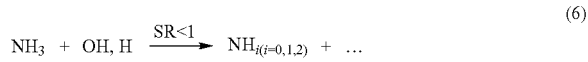   (6)

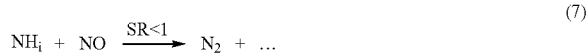   (7)

Variants of the SNCR include the addition of reducing agent via different streams, e.g., with the reburn fuel, with the air, or alone [11]. Each variant is limited to work under well-defined conditions. In absence of carbon monoxide (CO), fuel-lean SNCR works in the ranges 1100-1400 K, while fuel-rich SNCR works at higher temperatures. However, CO is present in nearly all processes where SNCR is used, with the detrimental consequence of shifting and narrowing the temperature windows. The conditions for optimal SNCR are hard to meet in many combustion devices.

Sequential Techniques

The aforementioned techniques (FS, AS, and SNCR) are often applied separately, but are also applied in sequential couples ("Hybrid reburn") or triplets ("Advanced reburn"). Hybrid reburn (HR) enlists reburning and SNCR, leading to 80-90% reduction [21]. Advanced reburn (AR) consists of a sequence of reburning, SNCR, and air staging, and leads to an outstanding NOx reduction of over 90% [22] (FIG. 1). Several configurations have been proposed for these two sequential techniques. In most cases, each component has been optimised individually, thus achieving a cumulative effect on NOx, but also extending the limits of each component to the overall system [e.g. 22]. To the best of our knowledge, only Chen et al. [21] and Folsom et al. [23] have attempted to optimise all components in synergy. Nevertheless, such optimisations have led to requirements that hardly can be applied in furnaces. For instance, precisely controlled stoichiometry ratios ($0.99<SR_{II}<1$ and $1<SR_{III}<1.02$) have been found necessary at reburn and burnout. More in general, we remark that all sequential techniques have been developed considering HCN detrimental, and thus forcing its concentration as low as possible along the process [e.g., 24].

NOx in Chemical Recovery Boilers

Black liquor received from chemical pulp production is usually burnt in a recovery boiler. As the organic and carbonaceous substances are burning, the inorganic compounds in the black liquor turn into chemicals that are recovered and reutilized in the pulping process. The organic part of the black liquor is turned into energy. The black liquor is introduced through liquor spraying devices in the form of small drops into a furnace of the boiler. To ensure complete combustion, combustion air is also introduced into the recovery boiler. Air is usually introduced at three different levels: primary air at a lower part of the furnace, secondary air above the primary air level but below the liquor nozzles, and tertiary air above the liquor nozzles. These three air levels are conventional basic air levels in a modern recovery boiler, but other or additional air levels may be provided in the recovery boiler. The combustion of black liquor produces also nitrogen oxides.

The reduction of NOx in recovery boilers has been addressed already by techniques based on staging or SNCR via i) the "quaternary air" in the upper portion of the boiler (upper furnace) [26], ii) the "vertical air staging" [27,29] in which air jets are fed into the furnace of the recovery boiler from nozzles located on at different elevations and in a pattern of vertical space-apart rows, iii) the "Mitsubishi Advanced Combustion Technology" (MACT) [28] where a reducing agent (urea) can be added after staging, and iv) black liquor staging [30] in which black liquor is fed from at least two levels into a furnace equipped with vertical air staging (ii). These techniques have proved 30-50% NOx reduction, but require operational adjustments that deviate from the optimum for the boiler. Also, these techniques require upsized boilers in order to maintain the temperature in the furnace sufficiently low, thus minimizing the conversion of fuel-N to ammonia ($NH_3$) and finally NOx. In practice, staged combustion in recovery boilers demands temperatures as low as 850-1000° C., which can be achieved only in boilers that are larger and thus more expensive than the conventional ones.

In addition to the techniques listed above (i-iv) we refer here to two more techniques that have been disclosed in two patent publications.

First, the patent application JP 7112116 discloses a method of reducing the amount of NOx in the exhausts of a black liquor recovery boiler by introducing additional black liquor in the upper furnace, above the conventional introduction level. In this stage ammonia and hydrogen cyanide are formed from the pyrolysis of the additional black liquor. It can be stated that this stage is arranged to generate reactants, i.e. $NH_3$ and HCN, for SNCR (Selective non-catalytic reduction of $NO_x$). In this system the targeted reaction is the direct reduction of $NO_x$ (formed in the primary combustion stage) under oxidizing conditions in the upper part of the furnace where the flue gas temperature is suitable, typically 850-1050° C. For instance, the direct reduction of NO by $NH_3$ is resumed by the overall reaction:

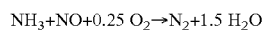

while the reduction of NO by HCN is resumed as:

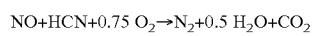

In these reactions oxygen is needed, as in all SNCR-systems, i.e. oxidizing conditions are needed in the reaction zone, where the additional black liquor is introduced.

Secondly, the patent FI 102397 discloses a process in which additional fuel is introduced into the recovery boiler above the usual liquor level. Here, the combustion conditions remain substoichiometric and the temperature is as unfavourable as possible for the formation of NOx. The additional fuels originate from the pulp manufacturing process and may be, for example, a malodorous gas or soap. These fuels contain hydrocarbons which, when burning, generate radicals that intensify the reactions of nitrogen compounds and finally reduce the amount of NOx compounds. After supply of the additional fuel, excess air is fed to the boiler for final combustion.

An object of the present invention is to provide a method of controlling emissions of harmful nitrogen compounds, and especially nitrogen oxides, from combustion processes in a more efficient and economical way as compared to the techniques described above.

SUMMARY OF THE INVENTION

The present invention provides a simple method of controlling emissions of harmful nitrogen compounds from combustion processes. The invention relates to a method in which i) fuel is combusted in a first zone in which nitrogen oxides are formed, ii) additional fuel is added in a second zone, in which reducing conditions prevail and temperature is controlled so that nitrogen oxides are converted substantially to hydrogen cyanide (HCN), after which iii) air is fed to the flue gases at at least two levels in a third zone located downstream of the second zone in order to generate conditions for final oxidation of combustibles and conversion of the HCN substantially to $N_2$.

The present invention utilizes the known technologies (fuel staging, air staging, and SNCR), but combines them in a new way, and optimizes them as a whole process rather than individually.

The present invention can preferably be applied:
in black liquor recovery boilers, where temperatures are low for other N Ox reducing techniques and whose size can be reduced for containing costs,
in industrial and domestic furnaces, where the size of the furnace limits the time or temperature available for NOx reduction, thus proscribing other techniques, and
in devices where SNCR is applied but not optimized owing to inappropriate temperatures for the used agent (e.g., ammonia, urea, etc. . . . ).

The application in black liquor recovery boilers currently is the most appealing, because the temperatures are low for other NOx reducing techniques, and the size of the boilers can be decreased, resulting in cost savings.

According to a preferred embodiment, the black liquor stream to be introduced into the furnace of a recovery boiler is split so that a first portion of the black liquor is fed to the furnace and combusted in a first zone, in which the conditions are maintained for elevated combustion efficiency, a second portion of the black liquor is introduced in a second zone in which reducing conditions prevail and the temperature is controlled so that the nitrogen oxides are converted substantially to hydrogen cyanide (HCN), after which air is fed at at least two levels in a third zone located downstream of the second zone in order to generate conditions for final oxidation of combustibles and conversion of the HCN substantially to $N_2$.

The invention is described in greater detail with reference to the attached drawings, of which:

Figure 1:
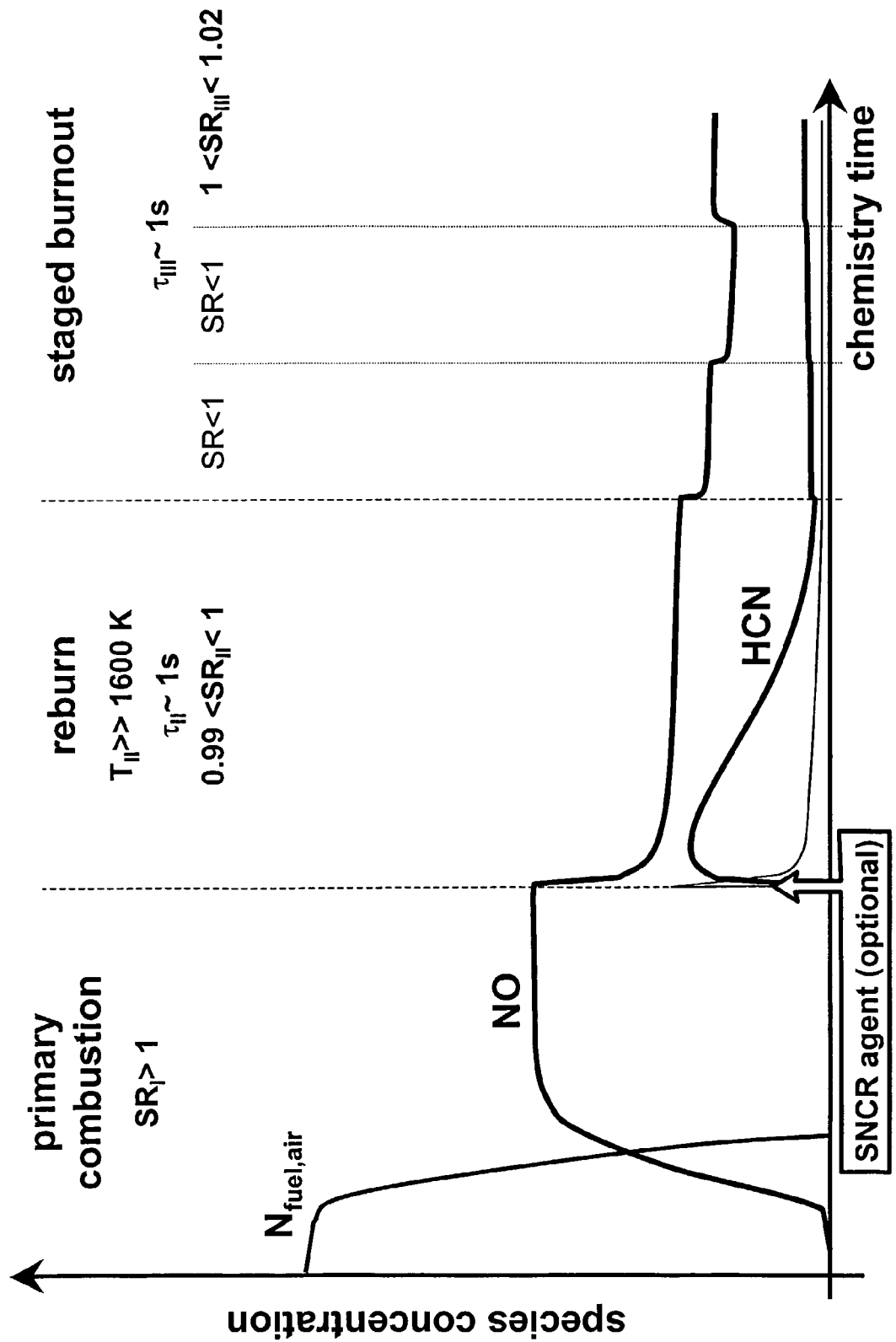
FIG. 1 shows the principle of a known sequential technique (advanced reburn) for reducing NOx emissions; concentration of nitrogen compounds as a function of time.

As by FIG. 1, the advanced reburn technique consists of a sequence of primary combustion, reburning, SNCR, and air staging. In the reburn zone the temperature is over 1600 K (in practice over 1700 K), and the chemistry time is about 1 s. Further, precisely controlled stoichiometry ratios ($0.99<SR_{II}<1$ and $1<SR_{III}<1.02$) are necessary at reburn and burnout. Such conditions have led to requirements that hardly can be applied in furnaces. Moreover, the formation of HCN is considered detrimental here, and thus its concentration is forced as low as possible along the process.

Figure 2:
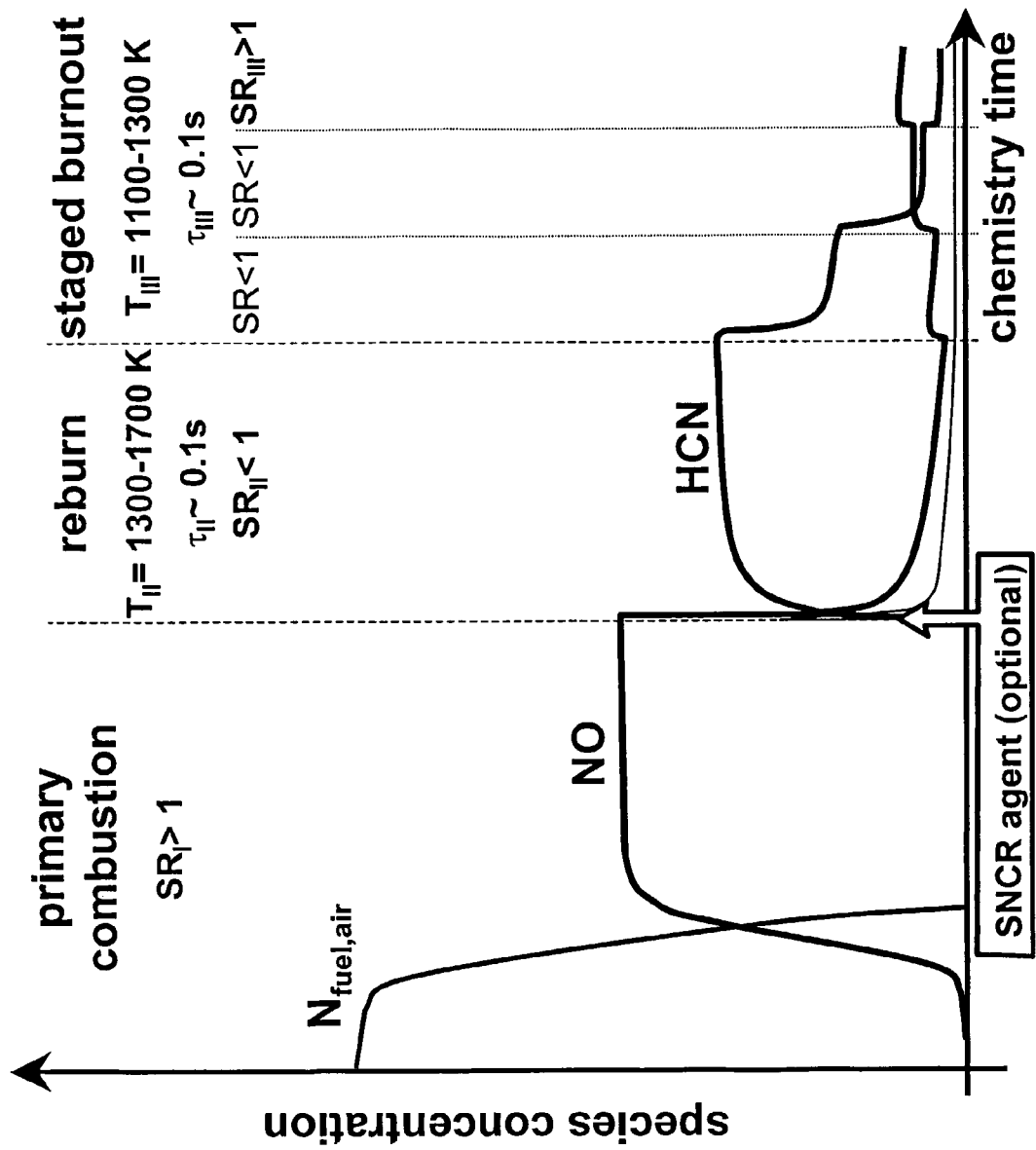
FIG. 2 shows a corresponding graph for the present invention.

As shown in FIG. 2, the present invention enlists a first zone (primary combustion), a second zone (reburn) where reducing agents can be supplied (optional SNCR), and an air staged third zone (burnout). While this layout is similar to that of FIG. 1, the purpose of reburn and burnout zones and thus their operation is substantially different. Here, the reburn is optimized for the conversion of NO formed in the first zone to HCN rather than $N_2$, and the staged burnout is optimized for the reduction of the HCN to $N_2$.

The formation of HCN is purposely enhanced to levels considerably above the concentration of NO in the reburn zone. The reburn zone has an optimized temperature window (1300-1700 K) which is lower than that of conventional fuel staging, and the SR is less than one (1). We underline that this optimization causes all N-compounds, including the SNCR agents, to convert preferentially to HCN.

Finally, the combustion air in the third zone is fed by air staging, which leads to a high conversion of the intermediate HCN to $N_2$. The temperature in the staged third zone is typically 1100-1300 K to give minimum conversion of the HCN to NO and $NO_2$ (together $NO_x$). The above can be summarized as follows:

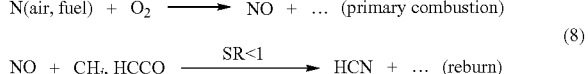

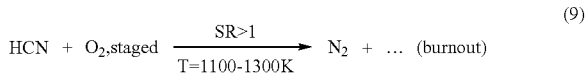

Thus, an essential feature of the invention stands on the endorsement of NOx reduction via the HCN intermediate in a synergy. As stated above, in all conventional staging techniques (fuel, air, or sequential) all efforts are made to minimize the formation of HCN. This is in serious contrast with the process of the invention in which accumulation of HCN in the second zone (reburn) is essential.

Figure 3:
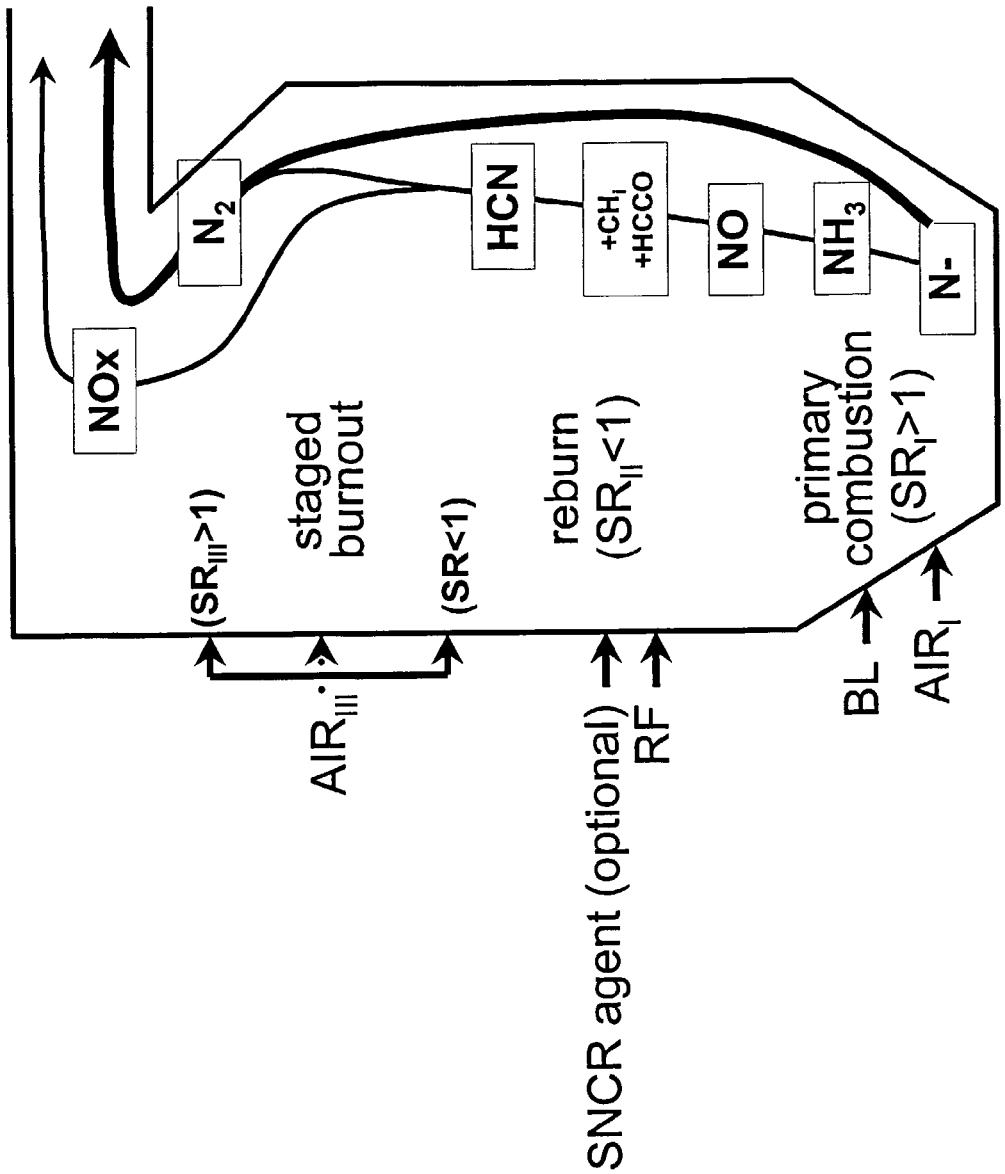
FIG. 3 shows a method of the present invention in a recovery boiler.

FIG. 3 illustrates the different zones when a method of the present invention is applied in the furnace of a recovery boiler.

In the lower furnace, pyrolysis and primary combustion are achieved by injecting black liquor (BL) via spraying devices (guns) at one or more levels and providing air ($AIR_I$) through ports on one or more levels. Thus, the furnace includes the understoichiometric conditions in its lowest part, followed by oxidizing conditions. Typically, the oxidizing conditions prevail for max. 0.5 sec measured as residence time for gases below the lowest black liquor gun (feed level), and may prevail for max. 3 sec measured as residence time for gases above it. $AIR_I$ is in excess ($SR_I>1$) so as to guarantee complete combustion of the black liquor. Here, a portion of nitrogen converts to $N_2$, and the rest converts to $NH_3$ and finally NO. Number and level of guns and ports are set for maximizing the conversion to $N_2$.

In the mid furnace, reburn fuel (RF) is added to set reducing conditions ($SR_{II}<1$). The RF may be any combustible substance; in recovery boilers it may be the same black liquor as the primary fuel or then methanol, turpentine, odorous gases, soap, natural gas or oil, or gas from biomass gasification (e.g.

bark, wood residues, saw dust). An SNCR agent can be added here; else, agents can form from the nitrogen compounds carried with the fuel. The $SR_{II}$ can be set low to discretion, in recovery boilers typically 0.85-0.98, preferably 0.88-0.92. This process works efficiently at the temperatures normally used in recovery boiler (1300-1700 K, typically about 1400-1550 K). Here, the NO from the lower furnace converts to HCN.

In the upper furnace, burnout air ($AIR_{III}$) is added to complete the process. The final excess air can be set here to the values usually set in recovery boilers for preventing emissions of unburned combustibles ($SR_{III}$=1.02-1.17, preferably 1.02-1.10). The burnout air is delivered via a number of stages (levels), two (2) or more for a prominent effect, but less than ten (10) for simplicity. Vertical air staging according to European patent 668983 is advantageous here. Temperatures that are usual in the upper furnace (about 1100-1300 K, typically 1200-1300 K) are compatible with this process. Here, a significant portion of HCN converts to $N_2$, and the remaining converts to NOx.

Our simulations indicate that the overall process requires only few tenths of a second (order of 0.1 s) and leads to NOx reductions over 40% under the conditions listed above.

An advantage of the present invention is that the fuel staging technique can be efficiently applied in the black liquor recovery boilers where the temperature levels in the furnace are typically too low for the conventional fuel staging chemistry to take place.

Figure 4:
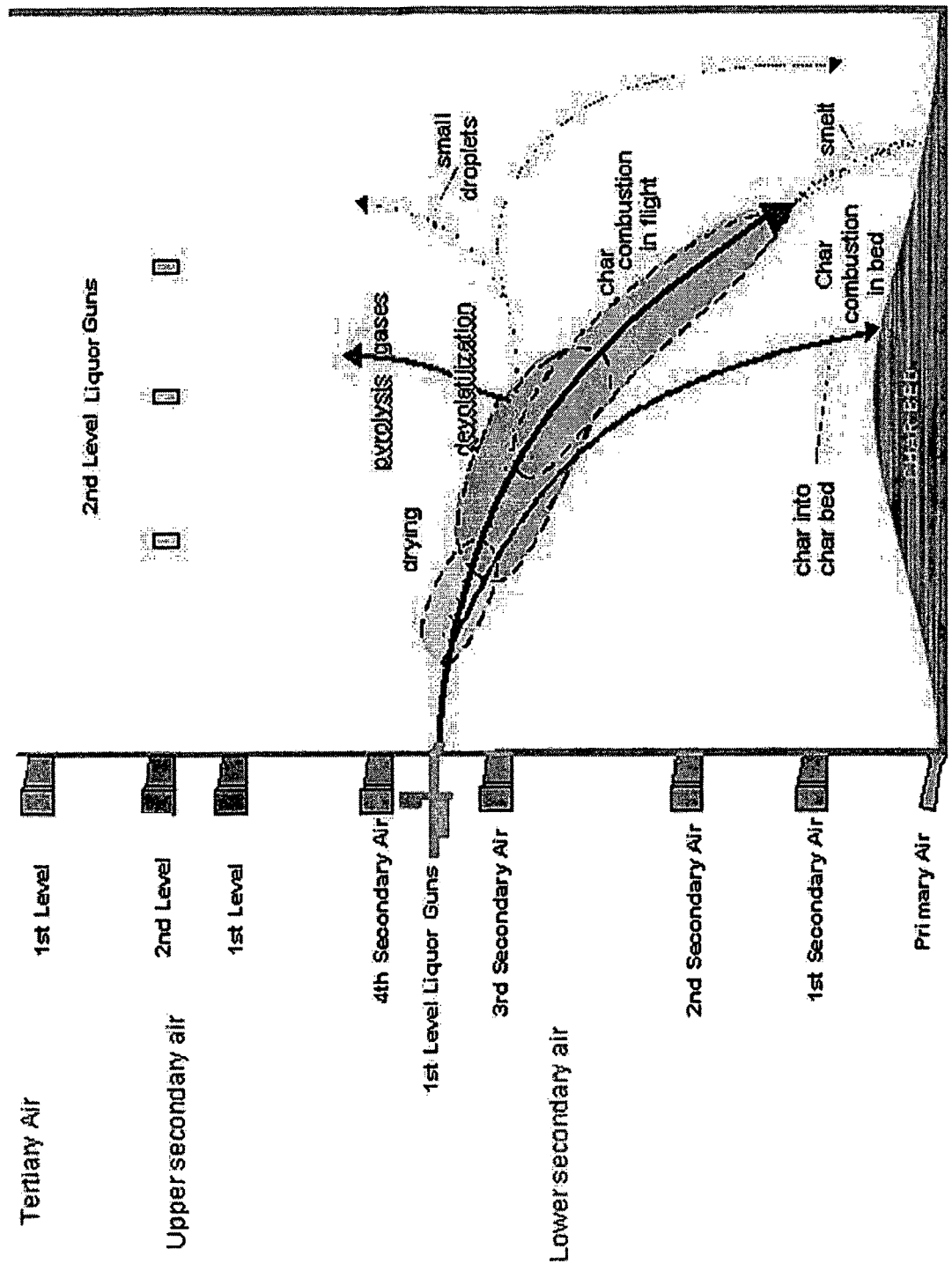
FIG. 4 is a schematic view of the furnace of a recovery boiler, in which a method of the present invention is applied.

FIG. 4 is a schematic view of the furnace of a recovery boiler, in which the invention is realized. According to the invention $NO_x$ can be reduced by adding secondary fuel (e.g. black liquor) injection into the furnace of the recovery boiler. Thus the black liquor to be combusted is split into two streams. The first stream—it can be called a primary fuel injection—is fed at a conventional introduction level or levels. Air is introduced at several levels, so that in the lower part of the furnace the normal pyrolysis and combustion of black liquor produces minimum amount of $NH_3$ and NOx (mainly NO). Thus in the lower part of the furnace, first the understoichiometric conditions prevail, followed by oxidizing conditions under which $NH_3$ is converted into NO and $N_2$. Typically one level is arranged for primary air, 1-3 levels for secondary air below the lowest liquor gun (feed level), and 1-3 levels for secondary air above the lowest gun. In this example, the air levels located just above the first guns are also called the (upper) secondary air, although currently used nomenclature identifies secondary air as being below the liquor guns. According to an embodiment of the invention, 1-3 levels of the secondary air located above the lowest liquor gun can be totally or partially replaced by flue gases having SR>1 from a combustion chamber system described in WO patent application 03104547. In this system the recovery boiler is provided with at least one combustion chamber (cavity) having walls formed of water-cooled tubes connected to the water/steam circulation system of the boiler, means for combusting a fuel and at least one outlet for discharging combustion gases to the boiler. The fuel used in the combustion chamber can be a gas from biomass gasification, natural gas, LPG, liquefied biomass, methanol, etc.

The secondary fuel injection is added downstream of the primary liquor injection in the vertical direction of the furnace. The combustion of the additional black liquor produces hydrocarbon radicals, which react with the nitrogen oxides in the flue gases from the lower furnace and convert at least part of the NOx in these gases into HCN. An essential feature of the invention is that additional secondary fuel, possibly black liquor, is supplied to the chemical recovery boiler so that the temperature (1300-1700 K, preferably 1400-1550 K) in the secondary fuel zone is lower than in the conventional fuel staging (in practice over 1700 K). The lower temperature results in a higher fraction of HCN and a much lower fraction of $N_2$ as the result of the reactions between the secondary fuel and the NOx in the primary flue gases. The stoichiometric ratio ($SR_{II}$) at the secondary fuel injection level is less than one (1), typically 0.85-0.98, preferably 0.88-0.92.

When the flue gases from the secondary fuel injection zone are burnt out with the final air to be supplied in the upper furnace, the resulting final flue gases contain less NO than the first flue gases from the lower furnace. The burnout air in the upper furnace is fed in gradually, or in several stages, thus applying air staging to the final burnout (only one level ($1^{st}$ tertiary level) is shown is FIG. 4, but there are one or more air levels in the upper part of the furnace). This leads to a high conversion of the intermediate HCN to $N_2$ during the burnout phase. The temperature in the staged burnout zone is preferably between 1200-1300 K to give maximum conversion of the HCN into $N_2$.

On the basis of the above, the present invention has at least the following advantages:
i) the new process can operate at lower temperatures than other NOx reducing techniques.
ii) it suffices shorter chemistry time than other reducing techniques, thus allowing to reduce the size of boilers.
iii) it is easier to control than known sequential techniques as it can operate well below and well above stoichiometry.
iv) it extends the applicability of SNCR as it converts any agent to HCN, which can be reduced more conveniently than other N-compounds.
v) it is more flexible than other techniques as it has wider operating windows (consequence of i-iv).

Computer simulations performed with a detailed kinetic model developed at Åbo Akademi University [25] confirm the advantages listed above. Accordingly, NOx reductions of over 40% are achievable by the invention. Also, only minor amounts of other hazardous compounds, such as $NH_3$, $N_2O$, are emitted. The present invention can lead to substantial NOx reductions in recovery boilers that operate at their optimum, are smaller, and thus are more economical overall.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

REFERENCES

[1] Zeldovich Y. B., Acta Physiocochim, USSR, 21, 577, 1946 (in Russian)
[2] Bowman C. T., Prog. Energy Combust. Sci., 1, 33-45, 1975
[3] Fenimore C. P., in Proc. of the $17^{th}$ Symp. (Int.) on Comb., 661-670, Leeds, England, Aug. 20-25, 1978
[4] Malte P. C., Pratt D. T., in Proc. of the $15^{th}$ Symp. (Int.) on Comb., 1061-1070, Tokyo, Japan, Aug. 25-31; 1974
[5] Coda Zabetta E., Kilpinen P., Energy & Fuels, 15, 1425-1433, 2001
[6] Winter F., Wartha C., Hofbauer H., Bioresource Technology, 70, 39-49, 1999
[7] Glarborg P., Jensen A. D., Johnsson J. E., in. Proc. of the $6^{th}$ Intern. Conf. on Technologies and Comb. for a Clean Environment, Oporto, Portugal, Jul. 9-12, 2001

[8] Heap M. P., Lowes T. M., Walmsley R., in Proc. of the 14th Symp. (Int.) on Comb., 883, 1973
[9] Wendt J. O. L., Sternling C. V., Matovich M. A., in Proc. of the 14th Symp. (Int.) on Comb., 897, 1973
[10] Zamansky V. M., Ho L., Maly P. M., Seeker W. R., in Proc. of the 26th Symp. (Int.) on Comb., 2075-2082, 1996
[11] Alzueta M. U., Bilbao R., Millera A., Glarborg P., Østberg M., Dam-Johansen K., Energy & Fuels, 12, 329-338, 1998
[12] Glarborg P., Kristensen P. G., Dam-Johansen K., Alzueta M. U., Millera A., Bilbao R., Energy & Fuels, 14, 828-838, 2000
[13] Jensen A., Johnsson J. E., Chemical Eng. Sci., 52, 1715-1731, 1997
[14] Coda B., Kluger F., Förtsch D., Spliethoff H., Hein K. R. G., Tognotti L., Energy & Fuels, 12, 1322-1327, 1998
[15] Lyngfelt A., Leckner B., Fuel, 78, 1065-1072, 1999
[16] Hasegawa T., Sato M., Ninomiya T., J. Eng. for Gas Turbines & Power, 120, 481-487, 1998
[17] Jødal M., Lauridsen T., Dam-Johansen K., Environmental Progress, 11, 296-301, 1992
[18] Lyon R. K., U.S. Pat. No. 3,900,554, 1975
[19] Arand J. K., U.S. Pat. No. 4,325,924, 1982
[20] Brogan T. R., U.S. Pat. No. 4,335,084, 1982
[21] Chen S. L., Cole J. A., Heap M. P., Kramlich J. C., McCarthy J. M., Pershing D. W., in Proc. of the 22nd Symp. (Int.) on Comb., 1135-1145, 1988
[22] Xu H., Smoot L. D., Energy & Fuels, 13, 411-420, 1999
[23] Folsom B. A., Sommer T. M., Latham C. E., Moyeda D. K., Gaufillet G. D., Janik G. S., Whelan M. P., 1997 Joint Power Generation Conf., Nov. 3-6, 1997
[24] Alzueta M. U., RØjel H., Kristensen P. G., Glarborg P., Dam-Johansen K., Energy & Fuels, 11, 716-723, 1997
[25] Coda Zabetta E., Kilpinen P., Hupa M., Stahl K., Leppälahti J., Cannon M., Nieminen J., Energy & Fuels, 14, 751-761, 2000
[26] Olausson L., European Patent No. EP 705363 B1, 1997
[27] Uppstu E., European Patent No. EP 668983 B, 1998
[28] Arakawa Y., Ichinose T., Okamoto A., Baba Y., Sakai T., in Proc. of the Int. Chemical Recovery Conf., Whistler, British Columbia, Jun. 11-14, 257-260, 2001
[29] Saviharju, K., "Soodakattilan päästöt", Suomen Soodakattilayhdistys ry, Raportti 8/2003, Soodakattilapäivä 16.10.2003, Helsinki
[30] Uppstu, E., Finnish Patent 103905 B, 1999

The invention claimed is:

1. Method of reducing the amount of nitrogen oxides present in flue gases which result from the combustion of fuels with air, the method comprising sequentially:
   (a) combusting fuel in a first zone to form a combustion gas containing nitrogen oxides;
   (b) adding additional fuel in a second zone located downstream of the first zone in which reducing conditions prevail and controlling the temperature and time of the combustion gas in the second zone so that the nitrogen oxides therein are preferentially and substantially converted to hydrogen cyanide (HCN) which thereby causes HCN to accumulate in the second zone, and thereafter
   (c) feeding air at at least two levels in a third zone located downstream of the second zone in order to generate conditions for final oxidation of combustibles and conversion of the HCN in the combustion gas from the second zone substantially to N2.

2. Method as regted in claim 1, wherein the stoichiometric ratio in the second zone is less than one and the temperature is 1300-1700K.

3. Method as regted in claim 1, wherein the temperature in the second zone is 1400-1550 K.

4. Method recited in claim 1, wherein the fuel is black liquor, which is combusted in a recovery boiler.

5. Method as recited in claim 4, wherein the additional fuel is also black liquor.

6. Method as recited in claim 4, wherein the additional fuel is methanol, turpentine, odorous gases, soap, natural gas or oil, or gas from biomass gasification.

7. Method as recited in claim 1, further comprising feeding an agent for selective non-catalytic reduction to the second zone.

8. Method of redugng the amount of nitrogen oxides present in flue gases which result from the combustion of black liquor with air, the method comprising seguentially:
   (a) combusting black liquor in a first zone to form a combustion gas containing nitrogen oxides;
   (b) adding additional fuel in a second zone located downstream of the first zone in which reducing conditions prevail and controlling the temperature and time of the combustion gas in the second zone so that the nitrogen oxides therein are preferentially and substantially converted to hydrogen cyanide (HCN) which thereby causes HCN to accumulate in the second zone, and thereafter
   (c) feeding air at at least two levels in a third zone located downstream of the second zone in order to generate conditions for final oxidation of combustibles and conversion of the HCN in the combustion gas from the second zone substantially to N2.

9. Method as recited in claim 8, wherein the stoichiometric ratio in the second zone is less than one and the temperature is 1300-1700K.

10. Method as recited in claim 8, wherein the temperature in the second zone is 1400-1550 K.

11. Method as recited in claim 8, wherein the additional fuel is also black liquor.

12. Method as recited in claim 8, wherein the additional fuel is methanol, turpentine, odorous gases, soap, natural gas or oil, or gas from biomass gasification.

13. Method as recited in claim 8, further comprising feeding an agent for selective non-catalytic reduction to the second zone.

14. Method as recited in claim 1 or 8, wherein the temperature in the second zone is 1300-1 600 K.

15. Method as recited in claim 1 or 8, wherein the addition fuel is gas from biomass gasification of bark, wood residues or saw dust.

* * * * *